(12) United States Patent
Pelgrims et al.

(10) Patent No.: US 11,799,563 B2
(45) Date of Patent: Oct. 24, 2023

(54) METHOD OF GENERATING ULTRASOUND AND ULTRASOUND GENERATOR

(71) Applicants: IMEC VZW, Leuven (BE); Katholieke Universiteit Leuven, KU LEUVEN R & D, Leuven (BE)

(72) Inventors: Jonas Pelgrims, Heverlee (BE); Kris Myny, Heusden-Zolder (BE); Wim Dehaene, Kessel-Lo (BE)

(73) Assignees: Imec vzw, Leuven (BE); Katholieke Universiteit Leuven, Leuven (BE)

( * ) Notice: Subject to any disclaimer, the term of this patent is extended or adjusted under 35 U.S.C. 154(b) by 0 days.

(21) Appl. No.: 17/209,548

(22) Filed: Mar. 23, 2021

(65) Prior Publication Data
US 2021/0306079 A1 Sep. 30, 2021

(30) Foreign Application Priority Data
Mar. 24, 2020 (EP) .................................. 20165225

(51) Int. Cl.
*H04B 11/00* (2006.01)
(52) U.S. Cl.
CPC .................................. *H04B 11/00* (2013.01)
(58) Field of Classification Search
CPC ...................................................... H04B 11/00
See application file for complete search history.

(56) References Cited

U.S. PATENT DOCUMENTS

| 3,872,330 A | 3/1975 | Miller et al. |
| 8,884,662 B2 * | 11/2014 | Ancis ................ H03K 19/0019 327/108 |
| 10,056,777 B2 * | 8/2018 | Kong ..................... H02J 7/0072 |
| 2004/0239368 A1 * | 12/2004 | Nautiyal ................ G11C 5/063 326/50 |
| 2014/0266327 A1 * | 9/2014 | Ancis ................ H03K 19/0019 327/112 |
| 2015/0174614 A1 * | 6/2015 | Van Rens ................ A61B 8/12 367/137 |

(Continued)

FOREIGN PATENT DOCUMENTS

| WO | 2013088359 A2 | 6/2013 |
| WO | 2013088359 A3 | 11/2013 |
| WO | 2017196898 A1 | 11/2017 |

OTHER PUBLICATIONS

Maxim Integrate, 2001, "Understanding SAR ADCs: Their Architecture and Comparison with Other ADCs". (Year: 2001).*

(Continued)

*Primary Examiner* — Isam A Alsomiri
*Assistant Examiner* — Joseph C Fritchman
(74) *Attorney, Agent, or Firm* — McDonnell Boehnen Hulbert & Berghoff LLP

(57) ABSTRACT

A method of generating ultrasound by driving an array of ultrasonic transducers comprises a charge transfer procedure. The charge transfer procedure comprises switching a terminal of a first ultrasonic transducer of the array, at a first electric potential, to a charge distribution bus; switching a terminal of a second ultrasonic transducer of the array, at a second electric potential different than the first potential, to the charge distribution bus; and allowing charge to flow between the first ultrasonic transducer and the second ultrasonic transducer through the charge distribution bus.

20 Claims, 4 Drawing Sheets

(56) References Cited

U.S. PATENT DOCUMENTS

2017/0330552 A1* 11/2017 Garlepp ............... B06B 1/0629
2018/0091235 A1   3/2018 Matsuda
2018/0116632 A1   5/2018 Yoo et al.

OTHER PUBLICATIONS

Extended European Search Report and Written Opinion, European Application No. 20165225.6, dated Oct. 1, 2020, 10 pages.

Butzen, Nicolas, and Michiel SJ Steyaert. "Scalable parasitic charge redistribution: Design of high-efficiency fully integrated switched-capacitor DC-DC converters." IEEE Journal of Solid-State Circuits 51, No. 12 (2016): 2843-2853.

Tillak, Judyta, Sina Akhbari, Nimesh Shah, Ljubomir Radakovic, Liwei Lin, and Jerald Yoo. "A 2.34 µJ/scan acoustic power scalable charge-redistribution pMUT interface system with on-chip aberration compensation for portable ultrasonic applications." In 2016 IEEE Asian Solid-State Circuits Conference (A-SSCC), pp. 189-192. IEEE, 2016.

Choi, K-J., and D-W. Jee. "High-efficiency, 6.6-29 V pulse driver using charge redistribution." Electronics Letters 54, No. 12 (2018): 746-748.

* cited by examiner

METHOD OF GENERATING ULTRASOUND AND ULTRASOUND GENERATOR

CROSS-REFERENCE TO RELATED APPLICATIONS

The present application is a non-provisional patent application claiming priority to European Patent Application No. 20165225.2, filed Mar. 24, 2020, the contents of which are hereby incorporated by reference.

FIELD OF THE DISCLOSURE

This application relates to a method of generating ultrasound by driving an array of ultrasonic transducers, and to an ultrasound generator comprising such an array.

BACKGROUND

Ultrasonic transducers, such as piezoelectric micro-machined ultrasonic transducers (PMUT), capacitive micro-machined ultrasonic transducers (CMUT), or bulk piezoelectric transducers (BPE), have a large range of applications in, for example, biometric authentication, imaging, and ranging.

Implementing such applications in mobile devices is challenging, as power consumption is a major concern for mobile technology. In addition, in applications that need large amounts of focused ultrasonic sound, power is a major concern as cooling and supplying a large amount of power is difficult and expensive.

SUMMARY

Aspects of the disclosure are directed to methods of generating ultrasound that consume less power than conventional solutions.

According to a first aspect, a method of generating ultrasound comprises driving an array of ultrasonic transducers. The method further comprises a charge transfer procedure that further comprises switching a terminal of a first ultrasonic transducer of the array, at a first electric potential, to a charge distribution bus; switching a terminal of a second ultrasonic transducer of the array, at a second electric potential different than the first potential, to the charge distribution bus; and allowing charge to flow between the first ultrasonic transducer and the second ultrasonic transducer through the charge distribution bus.

Ultrasonic transducers may typically present a capacitive or mostly capacitive load. By utilizing the charge distribution bus for sharing charge between the first ultrasonic transducer and the second ultrasonic transducer, discharging of the first ultrasonic transducer and charging of the second ultrasonic transducer may at least partially occur independent of an external voltage source. Moreover, phase differences that may occur in the arrays may be taken advantage of. In many cases, a number of transducers need to be charged up, while transducers phase-shifted with respect thereto need to be discharged. Rather than dumping the charge in, respectively, a power supply or ground, the charge that is pulled out of one transducer can be used to charge another transducer. Through one or more charge distribution buses, a charge may be transported from the transducers that are discharging to the ones that are charging.

Thereby, reactive power losses, due to the largely capacitive load typically presented by each of the first ultrasonic transducer and the second ultrasonic transducer, may be substantially reduced, saving power. Thus, an efficient driving method is provided, decreasing the power consumption of the array.

Compared to using coils to match the capacitive load of each ultrasonic transducer and compensating the coils to provide a purely resistive impedance, the need for respective individual matched coils for each transducer is eliminated, avoiding the high complexity that this would entail, which otherwise, especially for a large array, would result in a very large system that would be very expensive to build.

Compared to matching the total impedance of the full array with a single coil, one avoids imperfect matching due to a time-variant impedance, which can make matching challenging or make digital smart switching difficult.

The present method is applicable to any ultrasonic transducers presenting at least partially a capacitive load, such as piezoelectric micro-machined ultrasonic transducers (PMUT), or capacitive micro-machined ultrasonic transducers (CMUT), but also bulk piezoelectric transducers (BPE). Generally, the more purely-capacitive a load a transducer may present, the more efficient the method, relatively speaking, will be in saving power due to the reduction of reactive power losses.

According to one embodiment, the first ultrasonic transducer is steered to follow a first waveform and the second ultrasonic transducer is steered to follow a second waveform, different from the first waveform.

According to one embodiment, the second waveform is a phase-shifted version of the first waveform.

According to one embodiment, during the switching of the terminal of the first ultrasonic transducer and of the terminal of the second ultrasonic transducer to the charge distribution bus, one of the first waveform and the second waveform is at a rising edge and the other of the first waveform and the second waveform is at a falling edge.

According to one embodiment, the charge transfer procedure further comprises, after allowing charge to flow between the first ultrasonic transducer and the second ultrasonic transducer through the charge distribution bus, connecting at least one of the terminal of the first ultrasonic transducer and the terminal of the second ultrasonic transducer to a voltage source, or to ground. This allows the present method to be used in more cases, where the voltage source or connection to ground may be used to reach a desired potential, increasing flexibility if the desired potential cannot be directly reached through the charge transfer procedure while still at least partially achieving the aspects noted above regarding the charge transfer procedure.

According to one embodiment, during the charge transfer procedure, more than two ultrasonic transducers of the array are connected to the charge distribution bus. This is useful in large arrays, where many transducers may simultaneously have similar requirements for charging or discharging.

According to one embodiment, a plurality of charge transfer procedures is performed simultaneously. Each of the plurality of charge transfer procedures corresponds to the charge transfer procedure described above, and each charge transfer procedure involves the use of a different charge distribution bus. This is useful in large arrays, where different groupings of transducers may simultaneously have different charging and discharging requirements.

According to one embodiment, the method above is performed during ultrasonic beamforming. The method can compensate for issues that result from phase differences between arrays used during beamforming.

According to a second aspect, there is provided an ultrasound generator, comprising an array comprising a plurality of ultrasonic transducers; and at least one charge distribution bus, wherein at least a subset of the plurality of ultrasonic transducers is switchably connectable to the at least one charge distribution bus. Embodiments discussed above in conjunction with the first aspect are compatible with this second aspect.

According to one embodiment, the ultrasound generator comprises a plurality of charge distribution buses.

According to one embodiment, the plurality of ultrasonic transducers comprises one or more piezoelectric micro-machined ultrasonic transducers (PMUT), one or more bulk piezoelectric transducers (BPE), and/or one or more capacitive micro-machined ultrasonic transducers (CMUT).

BRIEF DESCRIPTION OF THE FIGURES

The above, as well as additional, features will be better understood through the following illustrative and non-limiting detailed description of example embodiments, with reference to the appended drawings. In the drawings, like reference numerals will be used for like elements unless stated otherwise.

All the figures are schematic, not necessarily to scale, and generally only show parts that are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

Figure 1:
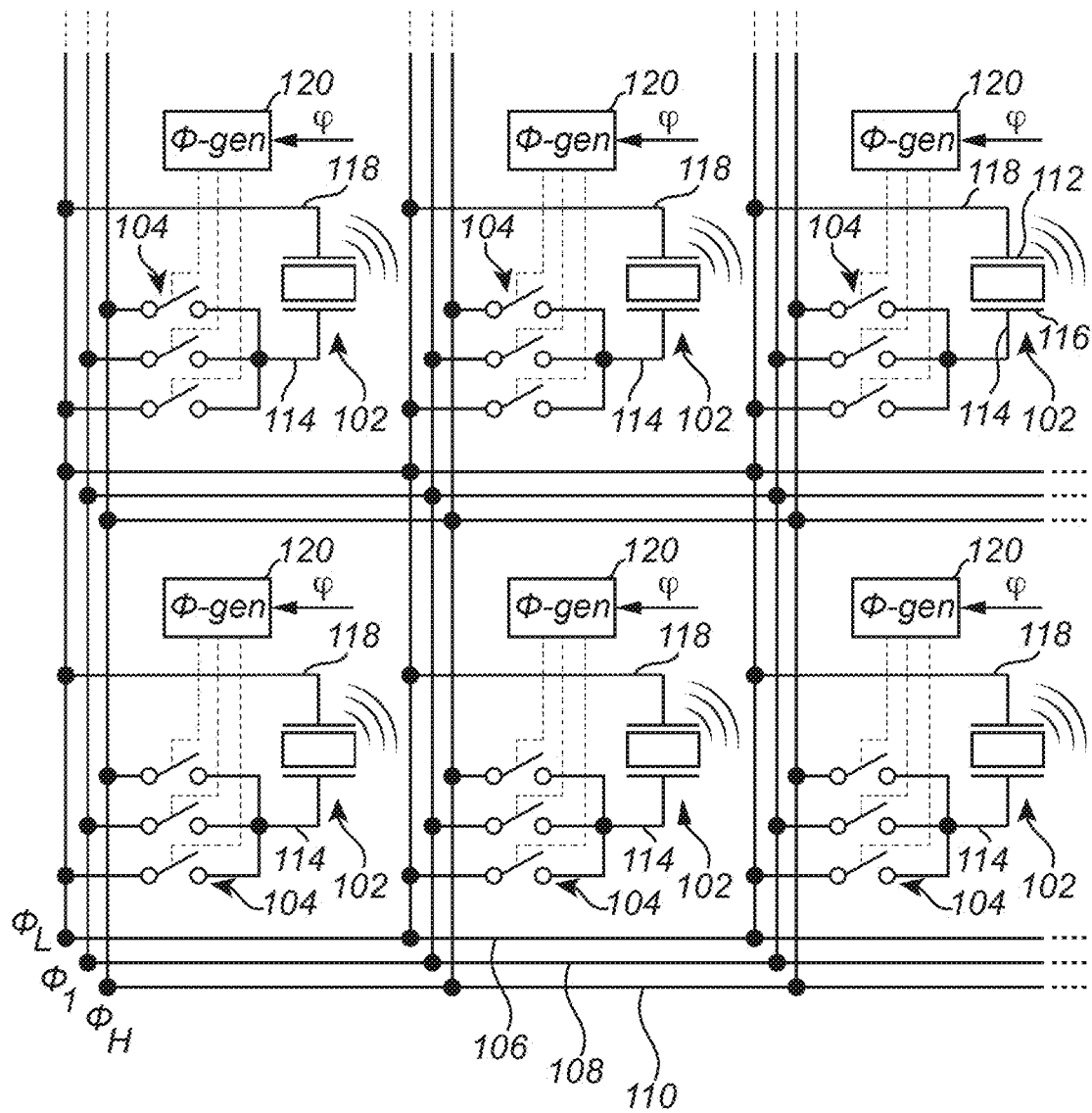
FIG. 1 shows part of an ultrasound generator comprising an array of a plurality of ultrasonic transducers, in accordance with example embodiments.

FIG. 1 shows part of an ultrasound generator 100. The ultrasound generator 100 comprises an array of a plurality of ultrasonic transducers 102. One or more of the ultrasonic transducers 102 may be piezoelectric micro-machined ultrasonic transducers (PMUT). For example, all transducers 102 may be PMUTs.

Alternatively, again, or additionally, one or more, or all, of the ultrasonic transducers 102 may be capacitive micro-machined ultrasonic transducers (CMUT).

Alternatively, or additionally, one or more, or all, of the ultrasonic transducers may be bulk piezoelectric transducers (BPE).

Further, the ultrasound generator comprises a ground distribution bus 106, a charge distribution bus 108, and a voltage distribution bus 110. Alternatively (cf. FIG. 3) the ultrasound generator 100 may comprise more than one charge distribution bus 108. The ground distribution bus 106 may typically be connected to ground and the voltage distribution bus 110 may be connected to a voltage source providing a DC voltage Vast.

Each ultrasonic transducer 102 comprises a first plate 116 connected to a first terminal 114 and a second plate 112 connected to a second terminal 118.

Each first terminal 114 of each ultrasonic transducer 102 may, as shown, be switchably connectable to the ground distribution bus 106, to the one or more charge distribution buses 108, and to the voltage distribution bus 110, through a respective high-voltage switch 104. Thus, all, or at least a subset, of the ultrasonic transducers 102 may be connectable to the at least one charge distribution bus 108.

Each second terminal 118 may, as shown, be fixedly connected to the ground distribution bus 106.

Each high-voltage switch 104 is controlled by a respective local controller circuit 120.

Figure 2A:
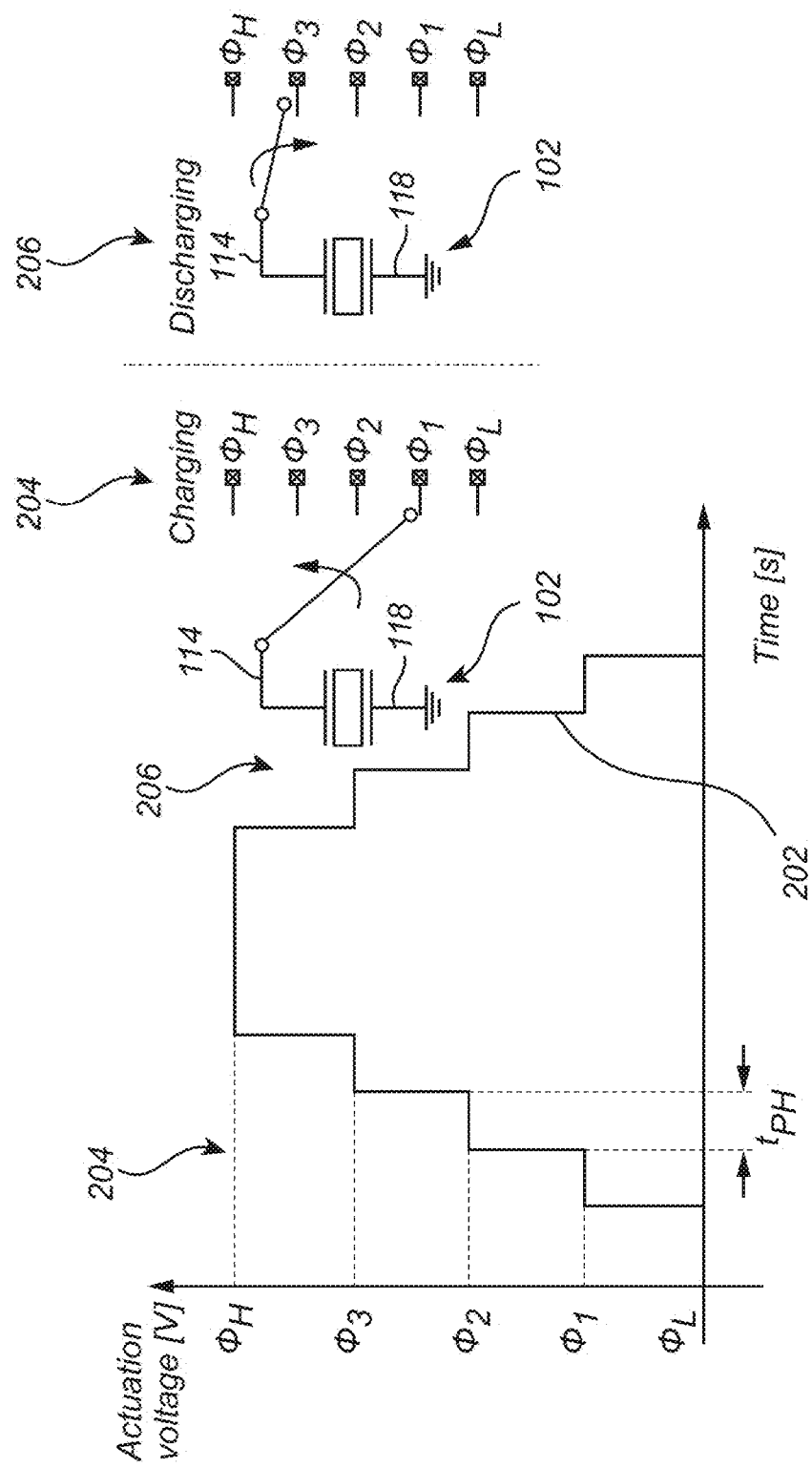
FIG. 2a shows charging and discharging of an ultrasonic transducer, in accordance with example embodiments.

FIG. 2a shows charging and discharging of an ultrasonic transducer 102 comprised in the array.

Generally, to generate ultrasound, a transducer 102 may be driven by an external voltage applied between its first terminal 114 and its second terminal 118.

In an equivalent model of the transducer 102, the external load that the transducer 102 presents between the first terminal 114 and the second terminal 118 may be represented as a dielectric capacitance ($C_{di}$) in series with a dielectric resistance ($R_{di}$). Typically, the dielectric capacitance of the transducer is dominant compared to the dielectric resistance. This translates to a mostly capacitive impedance looking into the transducer, i.e., the transducer 102 presents a largely capacitive load between its terminals 114, 118.

Due to the largely capacitive load, driving the transducer 102 with an activating voltage $V_{act}$ requires a large amount of reactive power, which can be estimated as $P=C_{di}\Delta V^2 f_0$ with C being the equivalent capacitance of the transducer, $\Delta V$ the full actuating swing, and $f_0$ is the driving frequency. Thus, when actuating the transducer with an actuation voltage, this may result in a power break-down where the reactive power component clearly outweighs the active part. In turn, the large reactive power may lead to large resistive losses. This may be mitigated through the method and charge sharing procedure of the present disclosure.

Through the driving of the transducer 102 by the external voltage between the first terminal 114 and the second terminal 118, the transducer 102 may be steered so that the resulting ultrasound signal exhibits a desired waveform.

For example, a square-wave may be applied between the first terminal 114 and the second terminal 118 of the transducer 102. This square-wave can be shifted in time to adjust the phase of the corresponding induced output signal of the transducer 102.

Alternatively, as shown in FIG. 2a, the voltage waveform 202 applied between the terminals 114, 118 of the transducer 102 may approximate an ideal smooth waveform through a number of discrete voltage levels, stepping between the voltage levels at a time interval $t_{PH}$, i.e., rather than applying the full actuating swing in a single step to the transducer, the actuating voltage is divided in smaller, successively building up until reaching the full actuating swing. The actuating voltage in N steps with a voltage increment of ($V_{act}/N$).

Still with reference to FIG. 2a, as illustrated, there may be a charging phase 204, corresponding to a rising edge of the ideal waveform, and a stepwise increase in the voltage waveform 202, and a discharging phase 206, corresponding to a falling edge of the ideal waveform, and a stepwise decrease of the voltage waveform 202.

In other words, during the charging phase 204, the first terminal 114 is successively switched towards a higher voltage, while in the discharging phase, the first terminal 114 is successively switched towards a lower voltage.

Figure 2B:
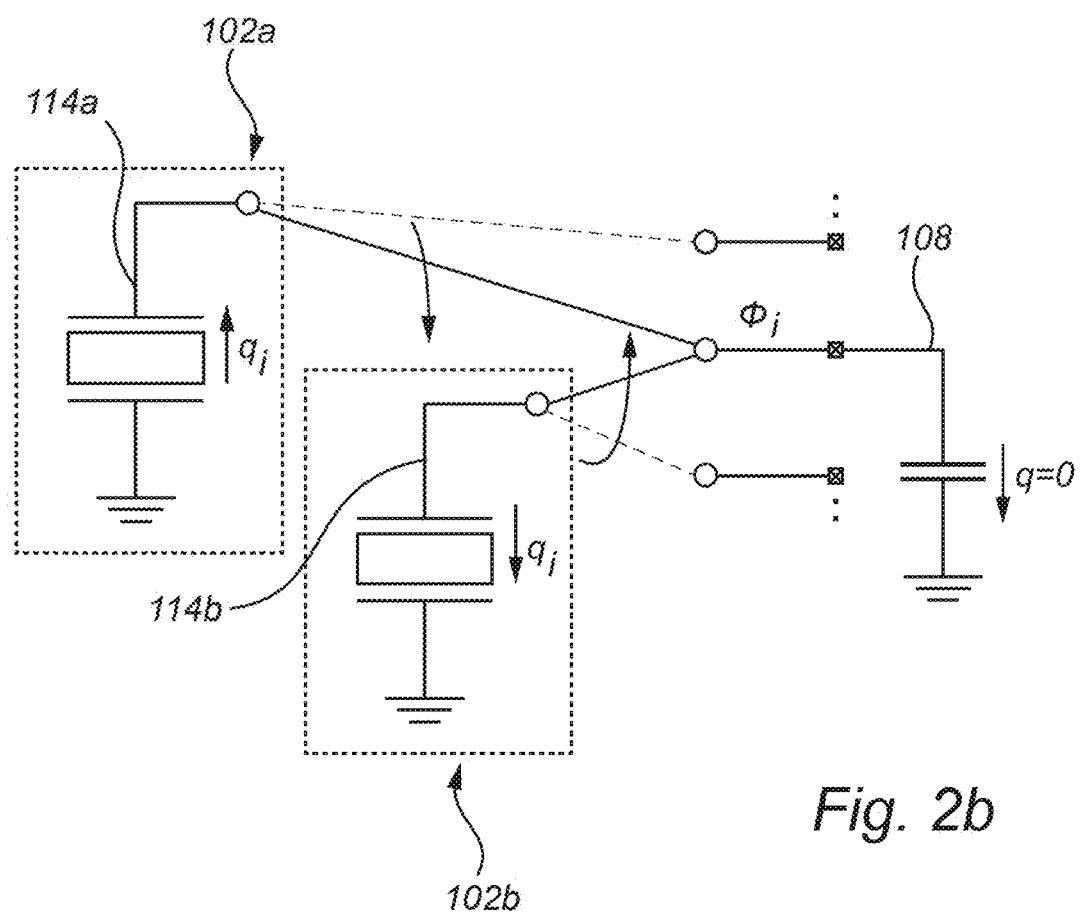
FIG. 2b shows charge sharing between a first ultrasonic transducer and a second ultrasonic transducer, in accordance with example embodiments.

FIG. 2b shows a charge sharing procedure between a first transducer 102a and a second transducer 102b, which may be comprised in an array of ultrasonic transducers forming part of an ultrasound generator, such as the ultrasound signal generator 100 of FIG. 1.

In the charge sharing procedure of FIG. 2b, the first terminal 114a of the first transducer 102a is switched to the charge distribution bus 108. Further, the first terminal 114b of the second transducer 102b is switched to the same charge distribution bus 108.

With the first terminal 114a of the first transducer 102a initially being at a first potential and the first terminal 114b of the second transducer 102b initially being at a second potential, a charge will flow between the first terminal 114a of the first transducer 102a and the first terminal 114b of the second transducer 102b, through the charge distribution bus 108, equalizing the potential between the first terminal 114a of the first transducer 102a and the first terminal 114b of the second transducer 102b.

Figure 3:
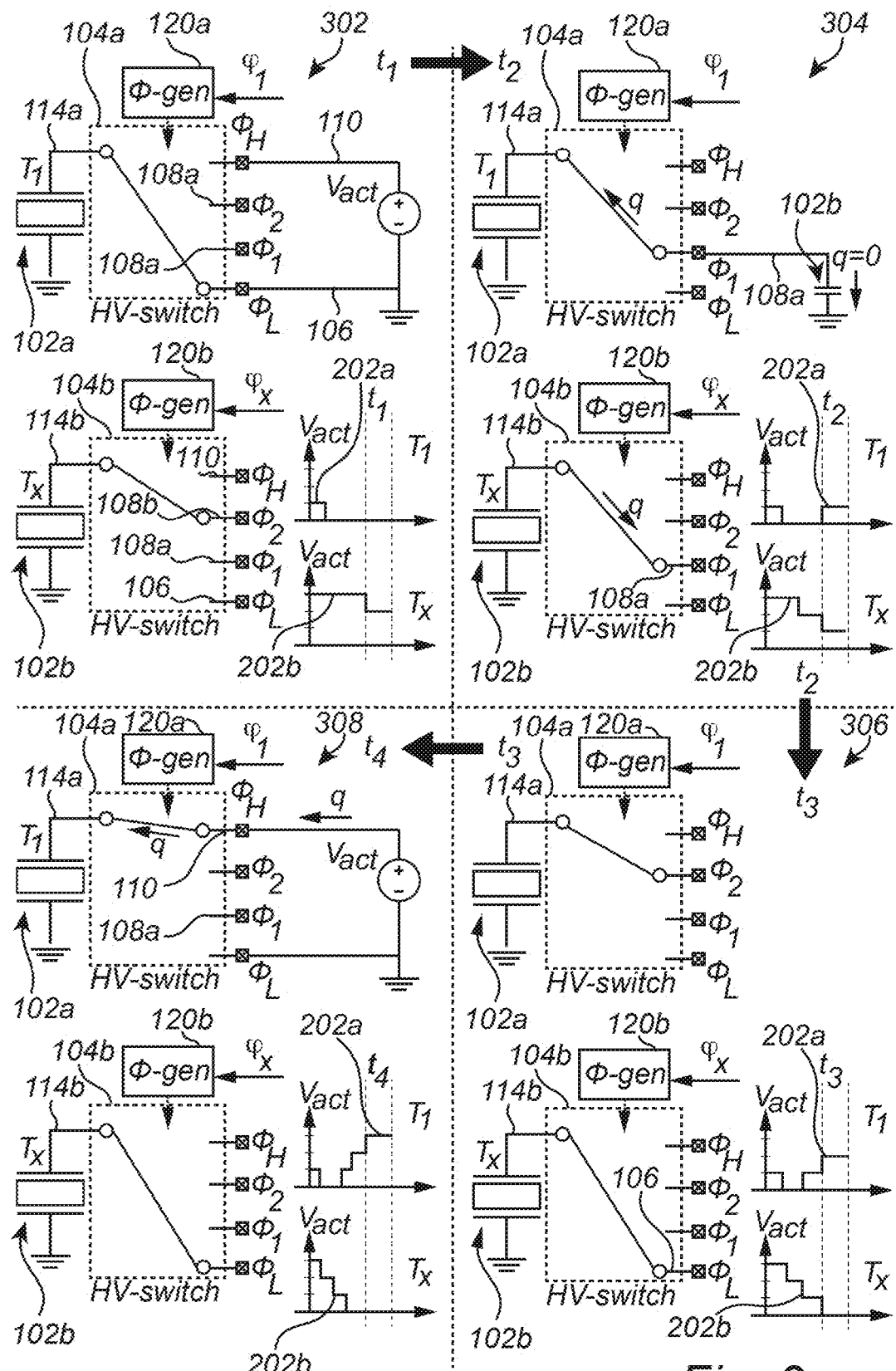
FIG. 3 shows charging and discharging of ultrasonic transducers in the array of FIG. 1, in accordance with example embodiments.

FIG. 3 shows charging and discharging of ultrasonic transducers in the array of FIG. 1, comprising a charge sharing procedure.

Generally, different transducers 102 of the array may be steered to different waveforms. For example, a first transducer 102a of the array may be steered to follow a first waveform 202a and a second transducer 102b of the array may be steered to follow a second waveform 202b, different from the first waveform 202a. As a specific example, the waveforms may be different in that the second waveform 202b is a phase-shifted version of the first waveform 202a. It may then be the case that one of the first waveform to which the first transducer 102 is steered and the second waveform, to which the second transducer 102 is steered, is at a rising edge and the other waveform at a falling edge. This may, for example, be the case during ultrasonic beamforming. By using beamforming to increase the output power at a certain point in space, each individual transducer 102 of the array is steered at a specific phase in order to focus at that point. This may result in a wide range of phases for the transducers 102 of the array.

FIG. 3 shows two different transducers of the array, viz., a first transducer 102a Ti and a second transducer 102b $T_x$. Each of the first transducer 102a and the second transducer 102b can be arbitrarily located in the array of transducers.

In the specific example of FIG. 3, the first transducer 202a and the second transducer 202b are driven to, respectively, a first waveform 202a and a second waveform 202b, wherein the second waveform 202a is phase shifted with respect to the second waveform 202b, for example for beam steering of the acoustic waves, i.e., beamforming.

In the four shown time-successive steps 302, 304, 306, 308, occurring at respective times $t_1$, $t_2$, $t_3$, and $t_4$, which may be equally spaced at a time interval $t_{PH}$, the first terminal 114a of the first transducer 102a Ti is successively charged from ground potential to the potential $V_{act}$ of the voltage distribution bus, following a first waveform 202a, while the first terminal 114b of the second transducer 102b is discharged from potential $V_{act}$ to ground potential following a second waveform 202b.

The respective first terminal 114a, 114b of each transducer 102a, 102b may be connected, by a respective high voltage switch 104a, 104b to the one or more charge distribution buses—in this example a first charge distribution bus 108a and a second charge redistribution bus 108b—to the ground distribution bus 106, and to the voltage distribution bus 110. Each high voltage switch 104a, 104b is driven by a respective local controller circuit 120a, 120b, which translates a certain phase, $\varphi_1$, $\varphi_x$ with the correct timing for the respective high voltage switch 104a, 104b.

First, at 302, the first terminal 114a of the first transducer 102a Ti is at ground potential, connected to the ground distribution bus 106 through the high-voltage switch 104a, and is to be charged up in the next steps in order to actuate the transducer 114a. The first terminal 114b of the second transducer 102b is at a potential ⅔ $V_{act}$ and is to be discharged due to the phase difference between $\varphi_1-\varphi_x$ between the first waveform 202a and the second waveform 202b.

Thereafter, at 304, the first transducer 102a Ti is switched by the high voltage switch 114a of the first transducer 102a to the first charge redistribution bus 108a. The second transducer 102b is also switched to the first charge distribution bus 108a by the high voltage switch 104b of the second transducer 102b. Hereby, through the first charge distribution bus 108a, the first transducer 102a is charged to ⅓ $V_{act}$, while the second transducer 102b is discharged to ⅓ $V_{act}$.

Thereafter, at 306, the first transducer 102a is switched by the voltage switch 114a to the second charge distribution bus 108b, which is connected to a transducer (not shown) of the array at potential $V_{act}$. Hereby, through the second charge distribution bus 108b, the first transducer 102a is charged to ⅔ $V_{act}$. The second transducer 102b is switched by the high-voltage switch 104b to the ground distribution bus 106. Hereby the second transducer 202b is discharged to ground potential. Thus, here at 306, after the equalizing at 304 between the first transducer 102a and the second transducer 102b, the first terminal 114b of the second transducer 102b is connected to ground.

Thereafter, at 308, the first transducer 102a $T_1$ is switched by the high voltage switch 114a of the first transducer 102a to the voltage distribution bus 110. Hereby, the first transducer 102a is charged to the potential $V_{act}$. Hereby, the power supply connected to the voltage distribution bus only needs to charge the first transducer from ⅔ $V_{act}$ to $V_{act}$. Thus, here at 306, after the equalizing at 304 and 306, the first terminal 114b of the first transducer 102a is connected to a voltage source through the voltage distribution bus 110.

More than two ultrasonic transducers of the array may be connected to the same charge distribution bus. For example, in the steps 302, 304, 306, 308 above, each of the first transducer 102a and the second transducer may represent two or more transducers simultaneously being switched to the charge distribution buses 108a, 108b as described.

Moreover, a plurality of charge transfer procedures, as described above in conjunction with FIGS. 2b and 3, may be performed simultaneously, each using a different charge distribution bus.

Further again, the method may be generalized to using more than one or two charge distribution buses.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A method of generating ultrasound by driving an array of ultrasonic transducers, the method comprising a charge transfer procedure comprising:
   switching, by way of a first switch, a terminal of a first ultrasonic transducer of the array, at a first electric potential, to a charge distribution bus, thereby charging the first ultrasonic transducer through the charge distribution bus;
   switching, by way of a second switch, a terminal of a second ultrasonic transducer of the array, at a second electric potential different than the first electric potential, to the charge distribution bus, thereby discharging the second ultrasonic transducer through the charge distribution bus; and
   allowing charge to flow between the first ultrasonic transducer and the second ultrasonic transducer through the charge distribution bus.

2. The method of claim 1, wherein the first ultrasonic transducer is steered to follow a first waveform and the second ultrasonic transducer is steered to follow a second waveform, different from the first waveform.

3. The method of claim 2, wherein the second waveform is a phase-shifted version of the first waveform.

4. The method of claim 3, wherein, during the switching of the terminal of the first ultrasonic transducer and of the terminal of the second ultrasonic transducer to the charge distribution bus, one of the first waveform and the second waveform is at a rising edge and the other of the first waveform and the second waveform is at a falling edge.

5. The method of claim 4, wherein the charge transfer procedure further comprises:
   after allowing charge to flow between the first ultrasonic transducer and the second ultrasonic transducer through the charge distribution bus, connecting at least one of the terminal of the first ultrasonic transducer, by way of the first switch, and the terminal of the second ultrasonic transducer, by way of the second switch, to a voltage source or to ground.

6. The method of claim 5, wherein, during the charge transfer procedure, more than two ultrasonic transducers of the array are connected to the charge distribution bus.

7. The method of claim 6, wherein a plurality of charge transfer procedures, each according to the charge transfer procedure, are performed simultaneously, each using a different charge distribution bus.

8. The method of claim 7, performed during ultrasonic beamforming.

9. The method of claim 3, wherein the charge transfer procedure further comprises:
   after allowing charge to flow between the first ultrasonic transducer and the second ultrasonic transducer through the charge distribution bus, connecting at least one of the terminal of the first ultrasonic transducer, by way of the first switch, and the terminal of the second ultrasonic transducer, by way of the second switch, to a voltage source or to ground.

10. The method of claim 3, wherein, during the charge transfer procedure, more than two ultrasonic transducers of the array are connected, by way of a plurality of individual switches, to the charge distribution bus.

11. The method of claim 2, wherein the charge transfer procedure further comprises:
    after allowing charge to flow between the first ultrasonic transducer and the second ultrasonic transducer through the charge distribution bus, connecting at least one of the terminal of the first ultrasonic transducer, by way of the first switch, and the terminal of the second ultrasonic transducer, by way of the second switch, to a voltage source or to ground.

12. The method of claim 2, wherein, during the switching of the terminal of the first ultrasonic transducer, by way of the first switch, and of the terminal of the second ultrasonic transducer, by way of the second switch, to the charge distribution bus, one of the first waveform and the second waveform is at a rising edge and the other of the first waveform and the second waveform is at a falling edge.

13. The method of claim 1, performed during ultrasonic beamforming.

14. The method of claim 1, wherein a plurality of charge transfer procedures, each according to the charge transfer procedure, are performed simultaneously, by way of a plurality of individual switches, each using a different charge distribution bus.

15. The method of claim 1, wherein, during the charge transfer procedure, more than two ultrasonic transducers of the array are connected to the charge distribution bus, by way of a plurality of individual switches.

16. The method of claim 1, wherein the charge transfer procedure further comprises:
    after allowing charge to flow between the first ultrasonic transducer and the second ultrasonic transducer through the charge distribution bus, connecting at least one of the terminal of the first ultrasonic transducer, by way of the first switch, and the terminal of the second ultrasonic transducer, by way of the second switch, to a voltage source or to ground.

17. An ultrasound generator comprising:
    an array comprising a plurality of ultrasonic transducers; and
    at least one charge distribution bus,
    wherein at least a subset of the plurality of ultrasonic transducers is switchably connectable, by way of a plurality of individual switches, to the at least one charge distribution bus, and wherein the plurality of individual switches includes at least a first switch and a second switch, wherein the first switch is connectable to the charge distribution bus to charge a first ultrasonic transducer of the plurality of ultrasonic transducers, wherein the second switch is connectable to the charge distribution bus to discharge a second ultrasonic transducer of the plurality of ultrasonic transducers.

18. The ultrasound generator of claim 17, further comprising a plurality of charge distribution buses.

19. The ultrasound generator of claim 18, wherein the plurality of ultrasonic transducers comprises one or more piezoelectric micro-machined ultrasonic transducers, PMUT, one or more bulk piezoelectric transducers, BPE, or one or more capacitive micro-machined ultrasonic transducers, CMUT.

20. The ultrasound generator of claim 17, wherein the plurality of ultrasonic transducers comprises one or more piezoelectric micro-machined ultrasonic transducers, PMUT, one or more bulk piezoelectric transducers, BPE, or one or more capacitive micro-machined ultrasonic transducers, CMUT.

* * * * *